United States Patent [19]

Ozawa

[11] Patent Number: 5,381,468
[45] Date of Patent: Jan. 10, 1995

[54] TELEPHONE EXCHANGE INCLUDING LESS DISPLAY ELEMENTS THAN CHANNELS

[75] Inventor: Isamu Ozawa, Hachiouji, Japan

[73] Assignee: Canon Kabushiki Kaisha, Tokyo, Japan

[21] Appl. No.: 881,095

[22] Filed: May 11, 1992

[30] Foreign Application Priority Data

May 14, 1991 [JP] Japan .................... 3-138393

[51] Int. Cl.⁶ .................. H04M 15/00; H04M 1/00; H04M 9/00
[52] U.S. Cl. ...................... 379/136; 379/137; 379/164; 379/396
[58] Field of Search .............. 379/113, 136, 122, 164, 379/381, 384, 88, 34, 137, 139, 267, 396

[56] References Cited

U.S. PATENT DOCUMENTS

| | | | |
|---|---|---|---|
| 4,408,100 | 10/1983 | Pritz et al. | 376/136 |
| 4,757,529 | 7/1988 | Glapa et al. | 379/244 |
| 4,790,004 | 12/1988 | Nalbone | 379/267 |
| 4,815,120 | 3/1989 | Kosich | 379/136 |
| 4,873,717 | 10/1989 | Davidson | 379/164 |
| 4,922,520 | 5/1990 | Bernard et al. | 379/88 |
| 4,924,488 | 5/1990 | Kosich | 379/136 |
| 4,988,209 | 1/1991 | Davidson et al. | 379/113 |
| 4,998,275 | 3/1991 | Braunstein | 379/164 |
| 5,073,922 | 12/1991 | Okada | 379/164 |
| 5,117,454 | 5/1992 | Yamase | 379/396 |
| 5,230,017 | 7/1993 | Alexander | 379/113 |
| 5,251,254 | 10/1993 | Tanigawa et al. | 379/164 |

FOREIGN PATENT DOCUMENTS

1231495 9/1989 Japan .

Primary Examiner—Stephen Chin
Assistant Examiner—Vijay Shankar
Attorney, Agent, or Firm—Fitzpatrick, Cella, Harper & Scinto

[57] ABSTRACT

A telephone exchange accommodates a plurality of lines in a primary group of an Integrated Services Digital Network (ISDN), as well as a plurality of extension terminals, in which a plurality of channels constitute each line. Control is performed in such a manner that the status of a line of an extension terminal when this terminal is using one channel among the plurality thereof is indicated by lighting an Light Emitting Diode (LED) in the color green, the status of a line of an extension terminal when this terminal is not using any of the plurality of channels but all of these channels are being used by other terminals is indicated by lighting the LED in the color red, and the status of a line of an extension terminal when this terminal is not using any of the plurality of channels but some of these channels are being used by other terminals is indicated by flashing the LED in the color red. The flashing period of the flashing red LED is made to differ in dependence upon the total number of channels and the number of channels in use.

22 Claims, 8 Drawing Sheets

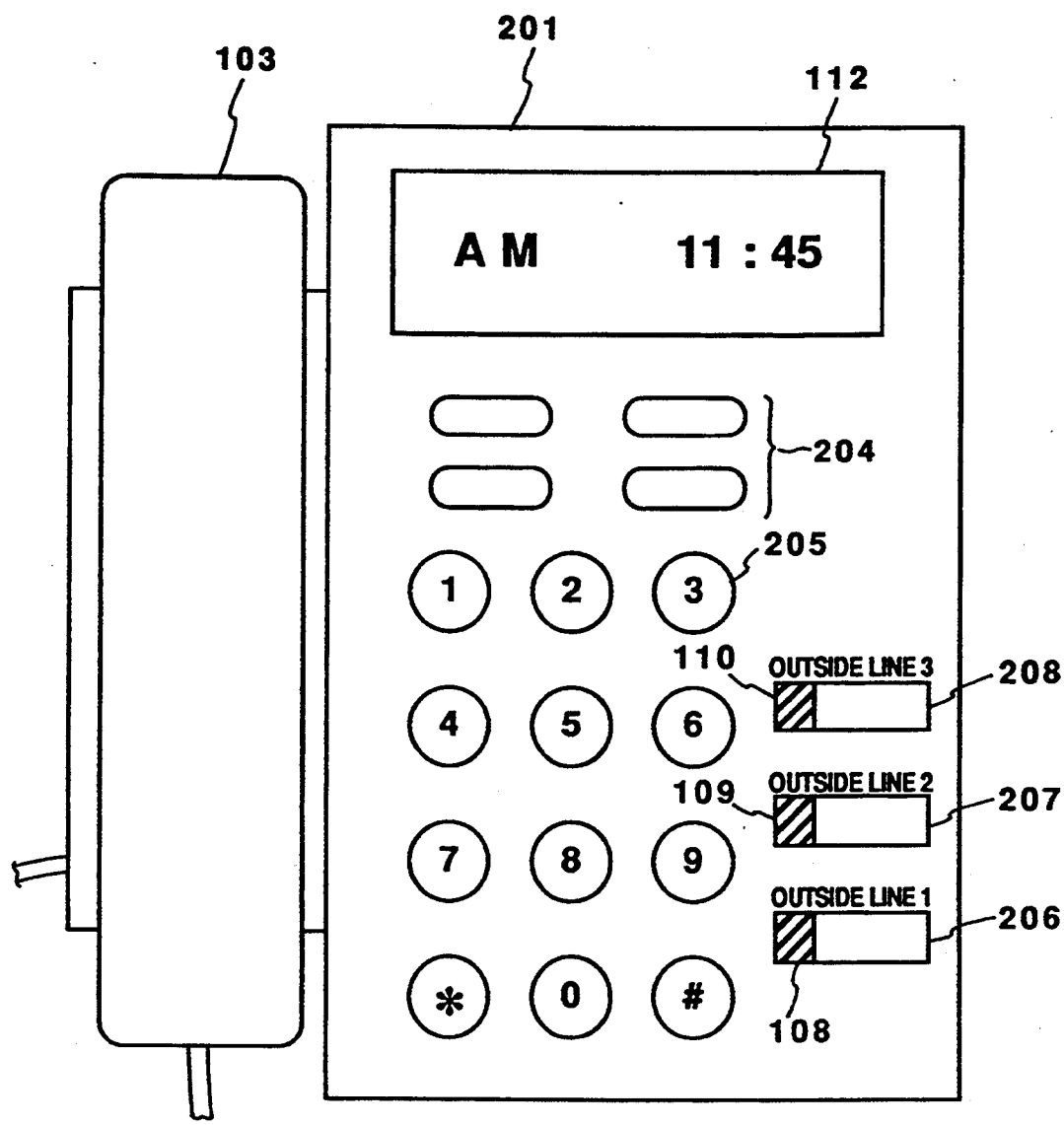
F I G. 2

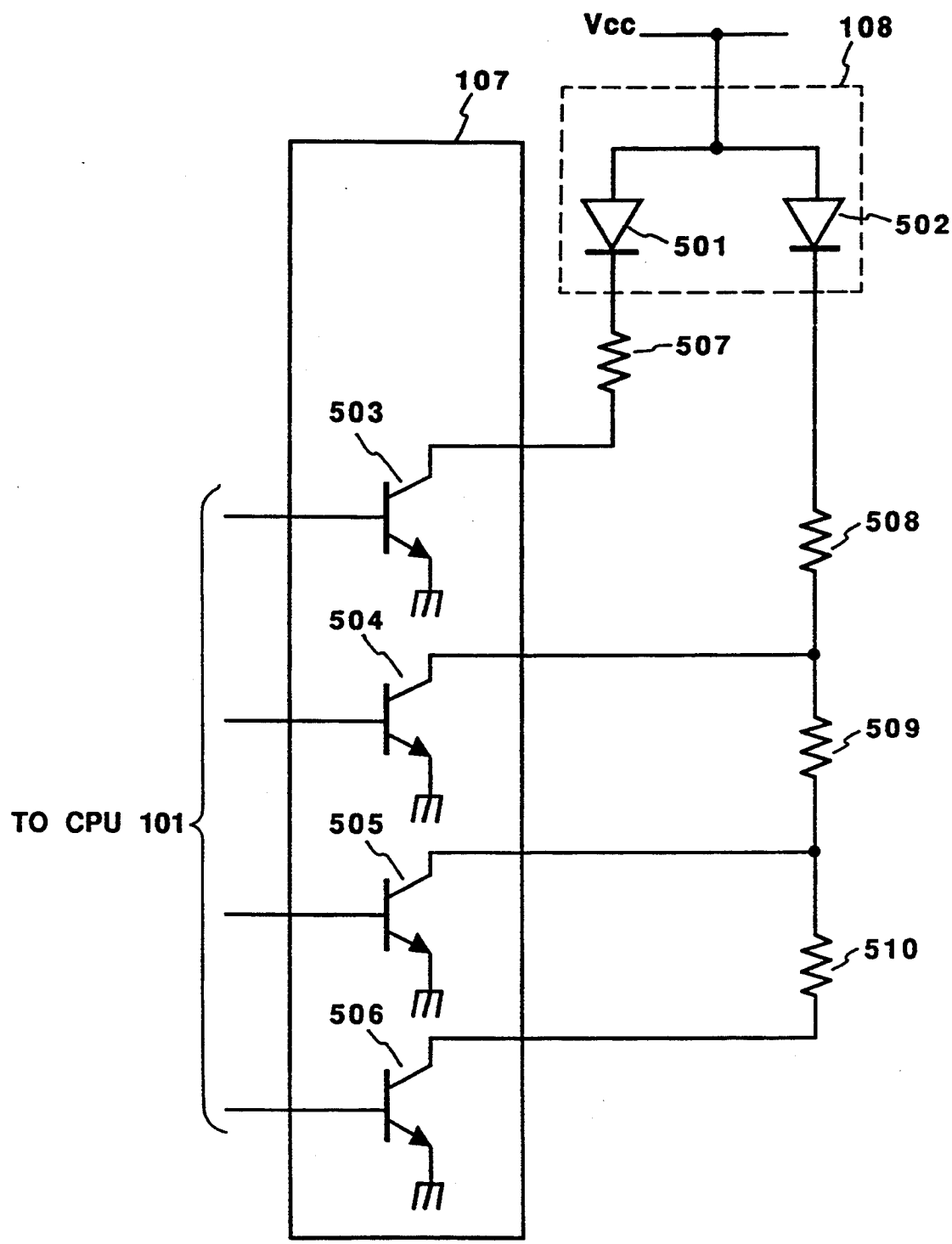
F I G. 5

TELEPHONE EXCHANGE INCLUDING LESS DISPLAY ELEMENTS THAN CHANNELS

BACKGROUND OF THE INVENTION

This invention relates to a telephone exchange accommodating lines having a plurality of channels capable of being handled as a group, wherein the state of use of each line is displayed.

In conventional telephone exchanges, a special-purpose extension telephone is provided with a plurality of LEDs, which correspond to outside-line keys for channel selection, in order to display the state of use of lines having a plurality of channels that are capable of being handled as a group. The state of use of the lines is indicated by the flashing state of the LEDs. An example of the LEDs employed is a two-color LED of, say, the colors red and green. The combination of the emitted colors and the flashing condition makes it possible to indicate the states of use of lines of a plurality of types.

Further, when the LED corresponding to an individual channel, such as channel 1, lights in the color green on a certain extension telephone accommodated in the conventional telephone exchange and the LED corresponding to channel 1 on another extension telephone lights in the color red, control is such that channel 1 is put in at the extension telephone whose green LED is lit.

However, such an arrangement in which an LED is provided for every channel is disadvantageous. For example, in a case where a telephone exchange accommodates a line having a plurality of channels, such as an arrangement in which one line has 23 (or 24) channels, as in the manner of the lines of a primary group of an ISDN, it is required that the number of LEDs be the same as the number of channels despite the fact that the telephone number assigned to the channels is the same. This is not only an impediment to a reduction in the size of the apparatus but is also uneconomical since it leads to a rise in the cost of the apparatus.

SUMMARY OF THE INVENTION

An object of the present invention is to provide a telephone exchange in which the state of use of a line having a plurality of channels is capable of being indicated using display elements the number of which is fewer than the number of channels.

According to the present invention, the foregoing object is attained by providing a telephone exchange which accommodates a line having a plurality of channels as well as a plurality of terminals, comprising monitoring means for monitoring states of the channels of the line, informing means for individually informing each of the terminals of the states of the channels and display means for displaying contents of information informed by said informing means by the number of display elements less than the number of said channels, wherein said display means displays states of the channels so as to distinguish between idle channels and channels in use.

In a preferred embodiment, the display means displays in such a manner that a display presented on a terminal when this terminal is using one channel among the plurality thereof, a display presented on a terminal when this terminal is not using any of the plurality of channels but all of these channels are being used by other terminals, and a display presented on a terminal when this terminal is not using any of the plurality of channels but some of these channels are being used by other terminals, differ from one another.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a plan view showing the external appearance of an extension telephone accommodated in the telephone exchange of the embodiment;

FIG. 5 is a diagram snowing an LED drive circuit of the extension telephone according to the embodiment.

DESCRIPTION OF THE PREFERRED EMBODIMENT

Figure 1A:
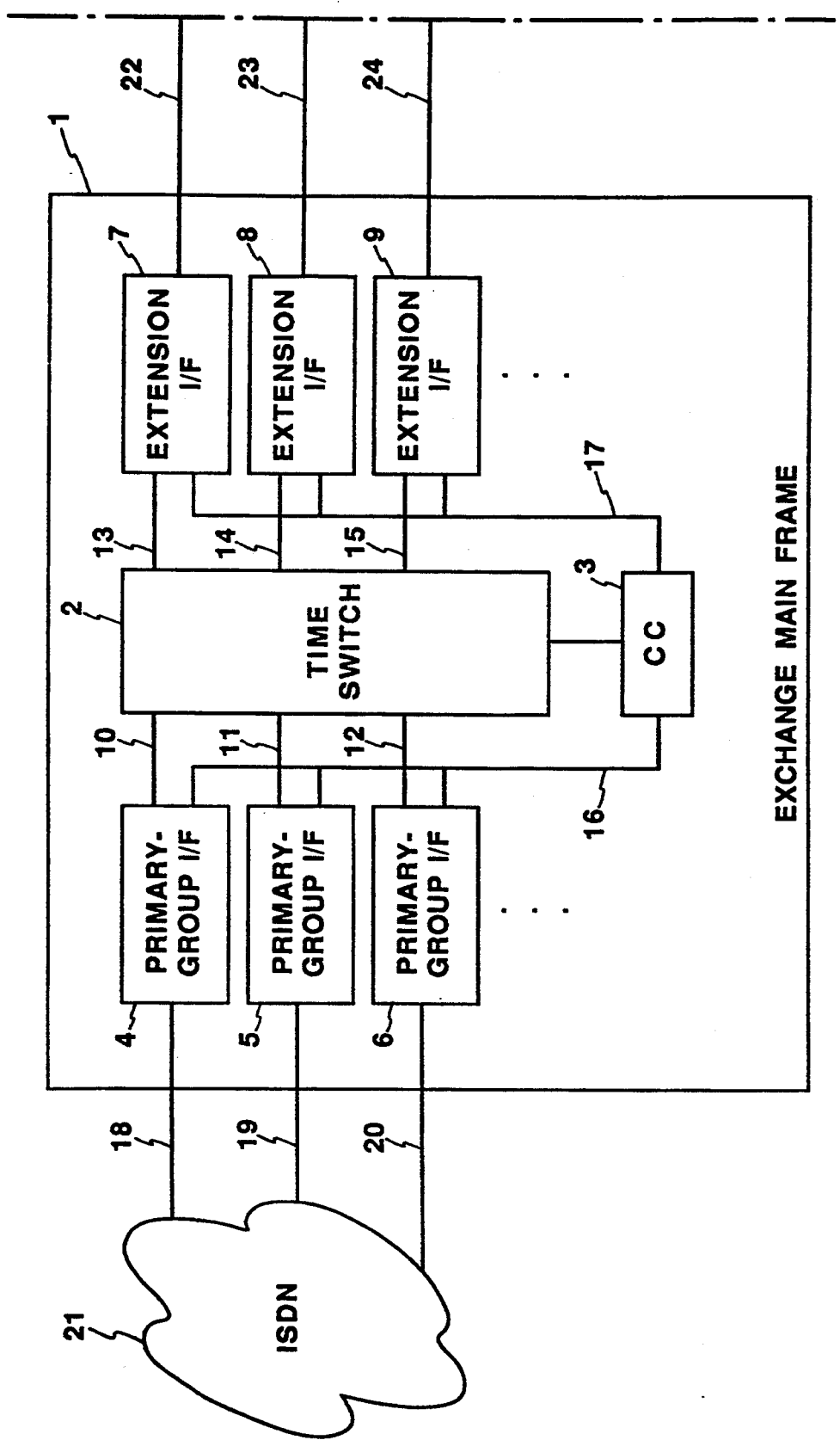
FIGS. 1A and 1B are block diagrams illustrating the overall construction of a telephone exchange according to an embodiment of the invention.
Figure 1B:
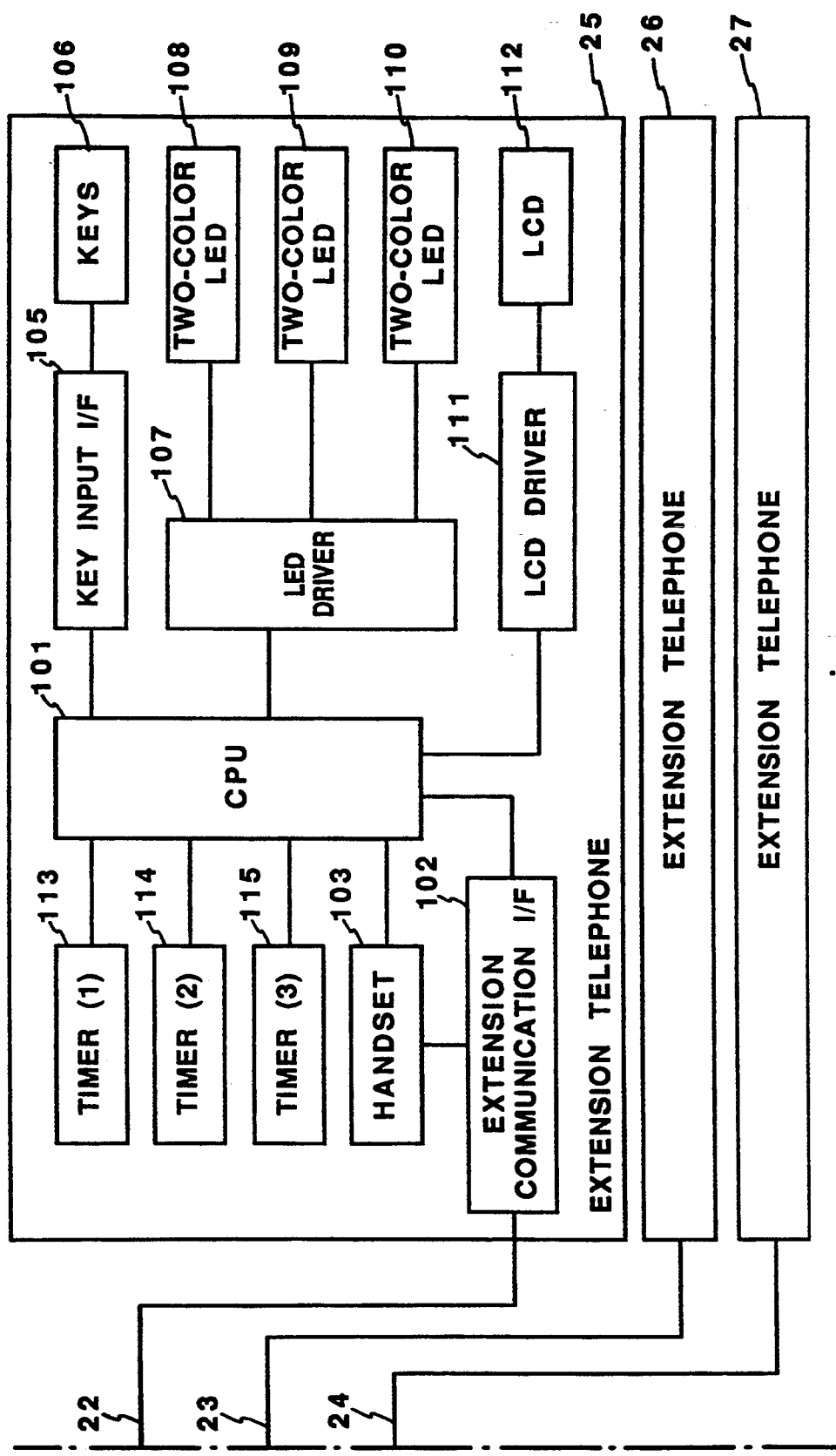
Figure 3:
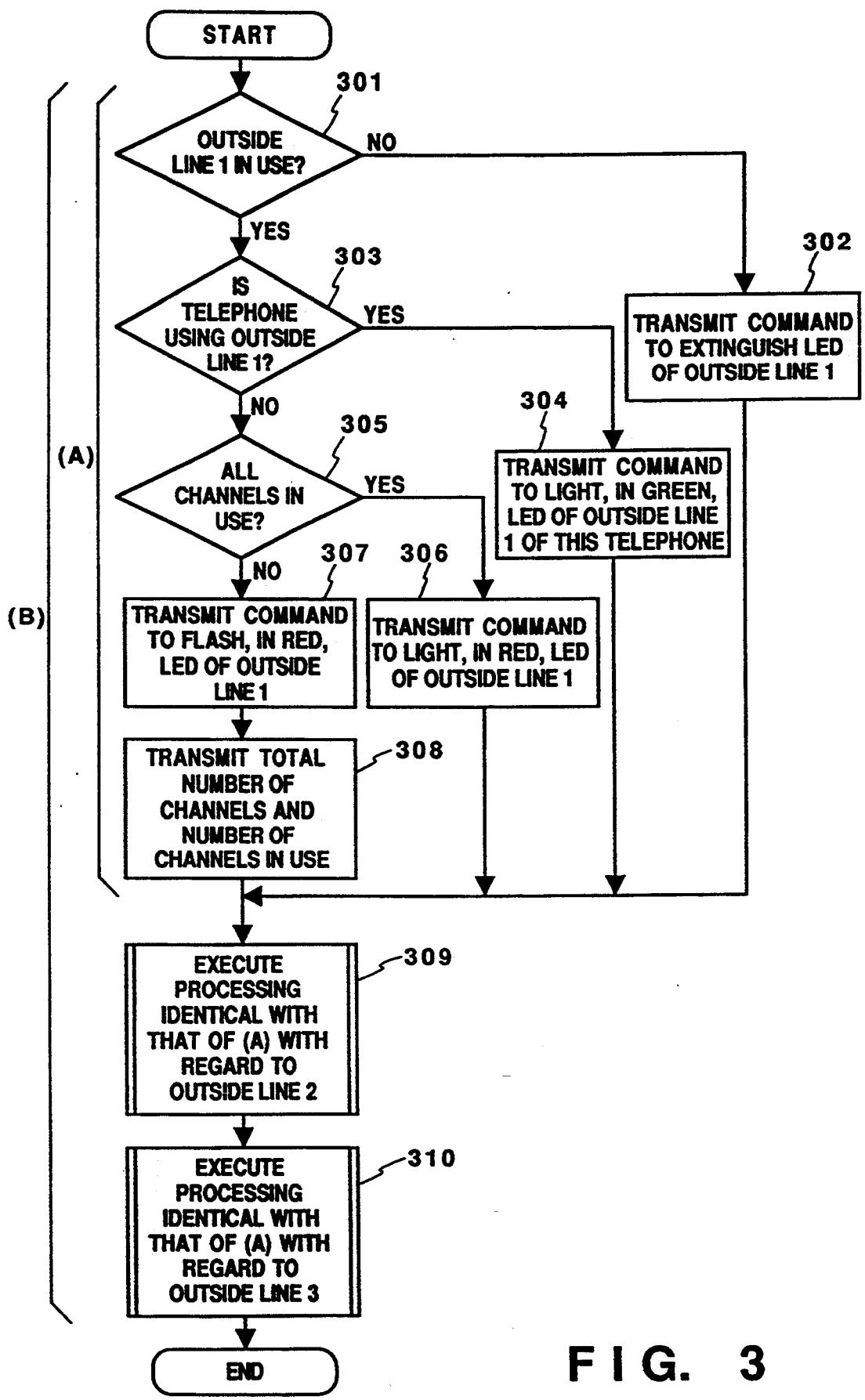
FIG. 3 is a flowchart illustrating the operation of the main frame of the telephone exchange according to the embodiment.
Figure 4A:
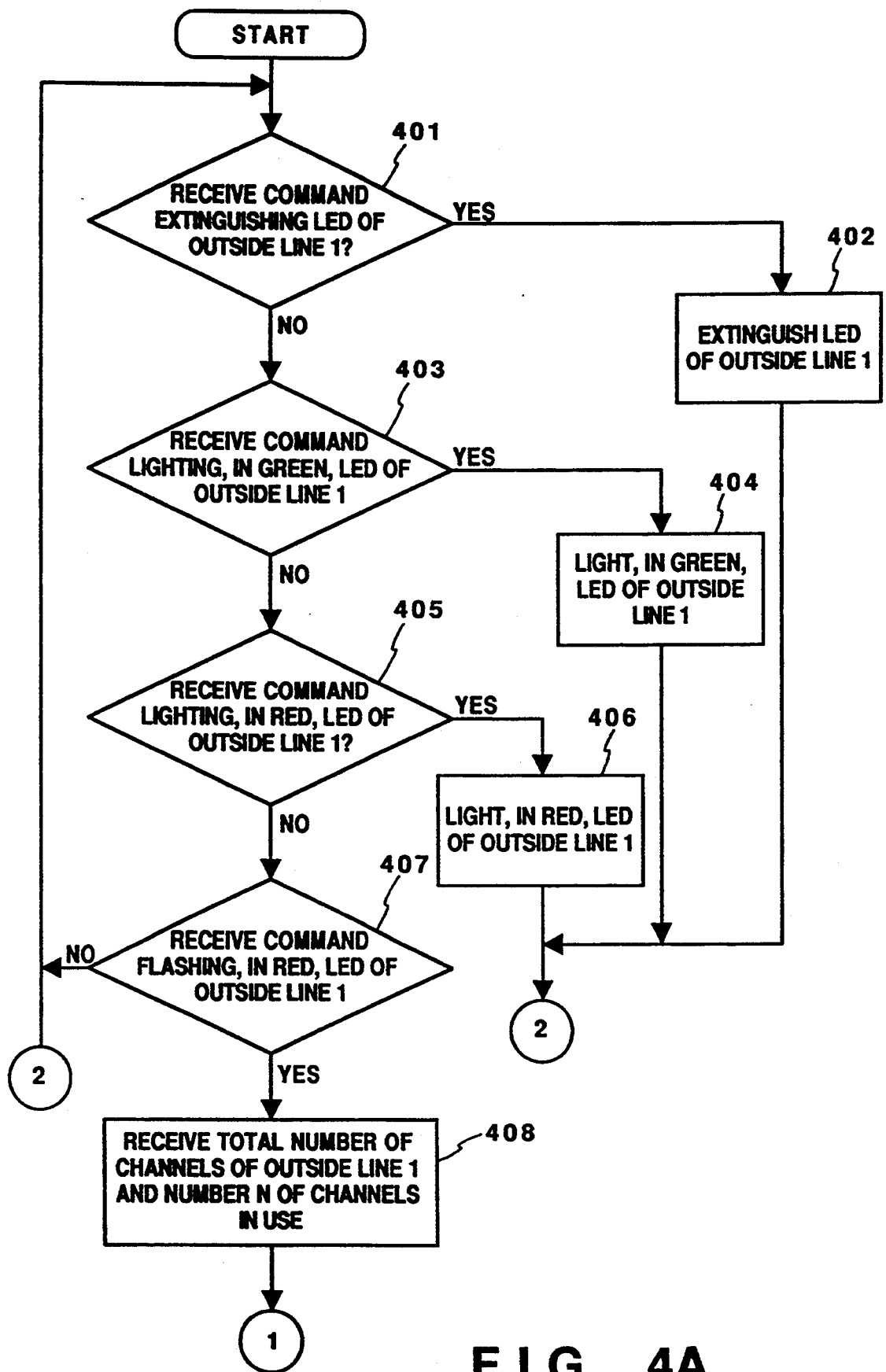
FIGS. 4A, 4B are flowcharts illustrating the operation of the extension telephone according to the embodiment.
Figure 4B:
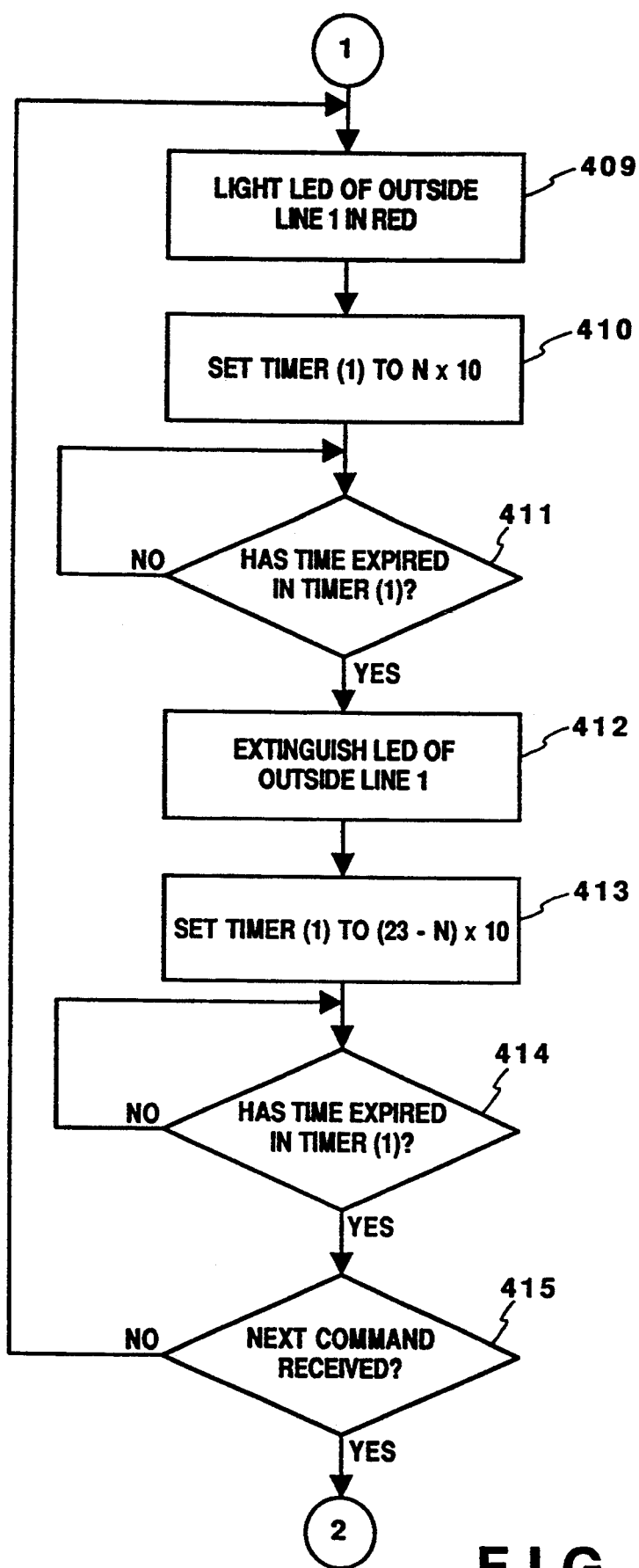

An embodiment of the present invention will now be described with reference to the drawings, in which FIGS. 1A and 1B are block diagrams illustrating the construction of a telephone exchange according to the embodiment, FIG. 2 is a plan view showing the external appearance of an extension telephone accommodated in the telephone exchange, FIG. 3 is a flowchart illustrating the operation of the main frame of the telephone exchange, and FIG. 4 shows flowcharts illustrating the operation of the extension telephone.

In FIG. 1, the telephone exchange includes a main frame 1 of the telephone exchange, and a plurality of extension telephones 25, 26, 27. The main frame 1 is connected to an ISDN via lines 18, 19, 20 of the primary group of the ISDN. The main frame 1 of the telephone exchange has a time switch 2 for switching PCM data in time-shared fashion, and a central controller (CC) 3 which performs overall control of the telephone exchange by controlling the time switch 2, primary-group interfaces (I/F) 4, 5, 6, extension I/Fs 7, 8, 9, and extension telephones 25, 26, 27. Each of the lines 18–20 of the primary group of the ISDN has, e.g., 23 channels, and the lines 18–20 are accommodated as outside lines "1"–"3".

The primary-group interfaces (I/F) 4–6 perform communication with the ISDN 21 via the ISDN primary-group lines 18–20, respectively, in accordance with control executed by the CC 3, and the extension I/Fs 7–9 perform communication with the extension telephones 25–27 via the extension lines 22–24, respectively, in accordance with control executed by the CC 3.

The time switch 2 and the primary-group I/Fs 4–6 are connected via respective PCM highways 10–12 for PCM data transmission, and the time switch 2 and extension I/Fs 7–9 are connected via respective PCM highways 13–15 for PCM data transmission. Further, the CC 3 and primary-group I/Fs 4–6 are connected via a signal line 16 for control, and the CC 3 and extension I/Fs 4~6 are connected via a signal line 17 for control.

In the extension telephone 25, a central processing unit (CPU) 101 performs overall control of the extension telephone. Further, the extension telephone 25 includes an extension communication I/F 102 for transmitting/receiving voice data and control signals to and from the extension I/F 7 of the telephone exchange 1 via a signal line 22, and a handset 103 for transmitting/receiving a voice signal to and from the extension communication I/F 102 in order to perform communication. The 103 has a speaker and microphone, not shown.

As shown in detail in FIG. 2, keys 106 of the extension telephone 25 include function keys 204 for selecting various functions, numeric keys 205 for inputting numerals such as dialed numbers, and outside-line keys 206~208 for selecting the outside lines "1"~"3", respectively. When any of these keys is operated, the operation is decoded by a key input I/F 105, and the code corresponding to the operation is read in by the CPU 101.

Further, as shown in detail in FIG. 2, the extension telephone 25 has an array of two-color (e.g., green and red) LEDs 108~110 corresponding to the outside-line keys 206~208, and a liquid-crystal display (LCD) 112 for displaying the present time, the called party's telephone number, etc. The two-color LEDS 108~110 are lit by being driven by an LED driver 107, and the LCD 112 presents a display by being driven by an LCD driver 111. Timers 113~115 are used in order that the CPU 101 may control the duty ratio at which the two-color LEDS 108~110 flash, as will be described below. It should be noted that the extension telephones 26, 27 are structurally identical to the extension telephone 25 and therefore the construction thereof is not illustrated.

The operation of the exchange main frame 1, especially the operation of the CC 3, will be described with reference to FIG. 3. FIG. 3 is a flowchart in which the CC3 controls two-color LEDs 108~110 of the extension telephone 25. The CC 3 controls the primary-group I/Fs 4~6 and monitors the state of use of each of the ISDN primary-group lines 18~20 via the signal line 16. If, by way of example, none of the 23 channels of the outside line "1" are being used, a "NO" decision is rendered at step 301 in FIG. 3 and the program proceeds to step 302, at which the CC 3 transmits a command for extinguishing the two-color LED 108 corresponding to the outside line "1" to the extension I/F 7 via the signal line 17. The extension I/F 7 transmits this command to the extension telephone 25 via the extension line 22.

If even one channel among the 23 channels of the outside line "1" is being used, the CC 3 determines, at step 303, that the extension telephone 25 is using the outside line "1". If it is determined that the extension telephone 25 is using the outside line "1", the program proceeds from step 303 to step 304, at which the CC 3 sends a command for lighting, in the color green, the two-color LED 108 corresponding to the outside line "1" of the extension telephone 25. The command is sent via the signal line 17 to the extension I/F 7.

The CC 3 determines at step 305 whether all channels of the outside line "1" are being used. If the answer is "YES", then the program proceeds from step 305 to step 306, at which the CC 3 sends a command to the extension I/F via the signal line 17 for lighting, in the color red, the two-color LED 108 corresponding to the outside line "1" of the extension telephone 25.

On the other hand, in a case where the outside line "1" is being used but not all 23 channels are busy, the program proceeds from step 305 to step 307, at which the CC 3 sends a command to the extension I/F 7 via the signal line 17 for flashing, in the color red, the two-color LED 108 corresponding to the outside line "1". Next, at step 308, the CC 3 transmits a signal indicating the total number of channels (=23) of outside line "1" and the number of channels in use (let this be n) to the extension I/F 7 via the signal line 17. With regard to the outside lines "2" and "3", commands for lighting the two-color LEDs 109 and 110 in conformity with the state of use thereof are transmitted in a manner similar to that described above (steps 309, 310).

Further, the CC 3 controls two-color LEDs 108~110 of respective extension telephones 26 and 27 in a manner similar to that described at steps 301~310.

Next, the operation of the extension telephones 25~27, especially the operation of the CPU 101 with regard to the outside line "1", will be described with reference to FIG. 4. When the CPU 101 receives, via the extension I/F 102, the command for extinguishing the two-color LED 108 corresponding to outside line "1" (step 401), the CPU 101 controls the LED driver 107 in such a manner that the two-color LED 108 is extinguished (step 402). Similarly, when the command for lighting, in the color green, the two-color LED 108 corresponding to outside line "1" is received (step 403), the CPU 101 lights the two-color LED 108 in the color green (step 404). When the command for lighting, in the color red, the two-color LED 108 corresponding to outside line "1" is received (step 405), the CPU 101 lights the two-color LED 108 in the color red (step 406).

On the other hand, when the command for flashing, in the color red, the two-color LED 108 corresponding to outside line "1" is received (step 407), the CPU 101 advances processing from step 407 to step 408, at which the CPU 101 then receives the signal indicating the total number (23) of channels of outside line "1" and the number (n) of channels in use. Then, at step 409 in FIG. 4B, the two-color LED 108 is lit in the color red.

This is followed by step 410, at which the timer 113 corresponding to the outside line "1" is set to an initial value (=N×10) conforming to the number n of channels in use, whereupon the counter 113 starts being counted down. When the time that has been set in timer 113 runs out, the program proceeds from step 411 to step 412, at which the two-color LED 108 is extinguished. Then, at step 413, the timer 113 is set to an initial value [=(23−N)×10] conforming to the number (=23−n) of unused channels, whereupon the counter 113 starts being counted down. When the time that has been set in timer 113 runs out, the program proceeds to step 415.

Here it is determined whether a subsequent command relating to outside line "1" has been received from the exchange main frame 1. If a command has not been received, the program returns to step 409. By repeating the above-described processing (steps 409~415), the two-color LED 108 is made to flash in the color red. However, if it is determined at step 415 that a subsequent command relating to outside line "1" has been received, then the program returns to step 401 and extinguishing/lighting processing (steps 402, 404, 406) conforming to the command is executed. Though not illustrated, processing for extinguishing, lighting and flashing the two-color LEDs 109, 110 is executed in the same manner with regard to the outside lines "2" and "3".

Thus, as described above, when outside line "1" is busy but not all of the 23 channels are busy, the two-color LED 108 of whichever of the extension telephones 25~27 is not using outside line "1" flashes in the color red. In this case, the duty ratio of flashing, namely the ratio of LED ON time to OFF time, is made proportional to the ratio of the total channel number (=23) to the used channel number n with regard to outside line "1". This means that the two-color LED 108 is capable of presenting an indication which conforms to the state of use of the 23 channels. For example, if five channels are in use (busy), the flashing duty ratio, namely the ratio of ON time to OFF time of this LED, will be 5:(23−5)=5:18.

In the foregoing embodiment, ISDN primary-group lines are described as an example of lines having a plurality of channels. However, it goes without saying that similar display processing can be applied also to other types of lines, such as ISDN basic-rate lines or dedicated lines.

Further, in the embodiment described above, the arrangement is such that the flashing duty ratio of ON time to OFF time is proportional to the ratio of the total number of channels to the number n of channels used. However, it is permissible to adopt an arrangement in which the duty ratio changes in fixed stages. For example, it is possible to flash the two-color LED in such a manner that the duty ratio varies as follows: ON "1":OFF "4" when the number n of channels in use is "1" to "6"; ON "2": OFF "3" when the number n of channels in use is "7" to "12"; ON "3": OFF "2" when the number n of channels in use is "13" to "18"; and ON "4": OFF "1" when the number n of channels in use is "19" to "22".

In the foregoing embodiment, the arrangement is such that the number of channels in use is indicated by the flashing duty ratio in a case where the outside line is busy but not all 23 channels are busy. However, this does not place a limitation upon the invention, for an arrangement may be adopted in which the number of channels in use is indicated by LED brightness, by way of example.

FIG. 5 illustrates a circuit arrangement for the LED driver for a case where the number of channels in use is displayed in the form of LED brightness. As shown in FIG. 5, an LED lighting voltage Vcc is applied to the anode of a green LED 501 and the anode of a red LED 502 constituting the two-color LED 108. The cathode of the green LED 501 is connected to the collector of a transistor 503 via a resistor 507 that is for deciding the brightness of the green LED, when this LED lights, in a case where an extension telephone uses any channels of the outside line "1".

On the other hand, the cathode of the red LED 502 is serially connected to a resistor 508 in order to decide brightness when this LED lights, and to resistors 509, 510 in order to decide brightness conforming to the number of channels in use. The junction of the resistor 508 and 509, the junction of the resistors 509 and 510, and the resistor 510 are connected to the collectors of the transistors 504, 505, 506, respectively. Control voltages from the CFU 101 are applied to the bases of the transistors 504~506, and the emitters thereof are grounded.

For example, if the number n of channels in use is "1" to "12", the transistor 506 is turned on and the transistors 504, 505 are turned off, whereupon the brightness of the red LED 502 is decided by all of the resistors 508~510. If the number n of channels in use is "13" to "22", the transistor 505 is turned on and the transistors 504, 506 are turned off, whereupon the brightness of the red LED 502 is decided by the resistors 508, 509. In this case, the red LED 502 will be brighter than it was when the number n of channels in use was "1" to "12".

In the case where all channels are in use, the transistor 504 is turned on and the transistors 505, 506 are turned off, whereupon the brightness of the red LED 502 is decided solely by the resistor 508. As a result, the red LED 502 attains maximum brightness. In a case where all channels are unused, the transistors 504~506 are turned off so that the red LED 502 is extinguished. If an extension telephone uses the outside line "1" and the transistor 503 turns on in this case, the green LED 501 lights.

Accordingly, if a line is in use but not all channels are in use, the number of channels in use is indicated by the brightness of the red LED 502. This means that plural states of use of a single line can be indicated by the signal red LED 502.

Furthermore, it is permissible to adopt an arrangement in which an LCD displays the number of channels in use or the number of channels that are idle in correspondence with a line at the same time that the flashing duty ratio or brightness of the corresponding LED is varied.

Thus, the state of use of a single line having a plurality of channels is capable of being indicated by a single indicator element, such as an LED, and the number of these indicator elements can be made less than the number of channels of the Line.

Figure 6:
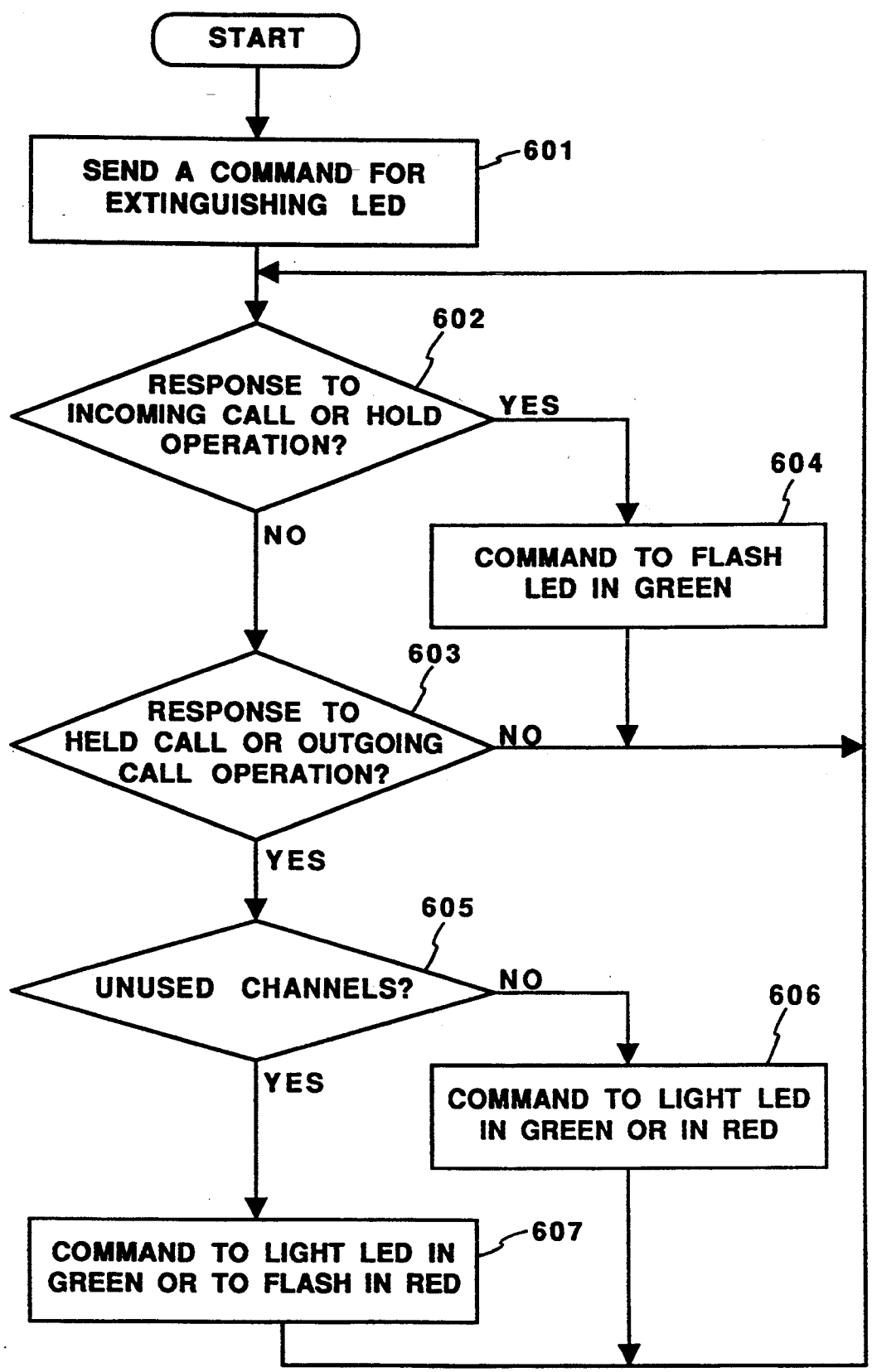
FIG. 6 is a flowchart illustrating the operation of a telephone exchange according to another embodiment.

FIG. 6 is a flowchart which illustrates the operation of a telephone exchange according to another embodiment of the present invention. It should be noted that the construction of the exchange is the same as that shown in FIGS. 1 and 2.

First, the CC 3 sends a command to each of extension telephones 25~27 via the extension I/Fs 7-9 of extinguishing respective two-color LEDs 108~110 (step 601).

Next, the CC3 determines if there is an incoming call from the ISDN 21 to the primary-group I/Fs 4~6, or, at the extension telephones 25~27, a hold operation or a response to an incoming call, a response to a held call on an outgoing call operation is performed (steps 602, 603).

The CC 3, if it is determined that there is the incoming call from the ISDN 21 or the hold operation is performed at any of the extension telephones 25~27, sends a command to each of the extension telephones 25-27 via the extension I/Fs 7~9 for flashing, in the color green, the two-color LED corresponding to the incoming call or the held outside line (step 604).

If the CC 3 determines at step 603 that the response to the incoming call, the response to the held call or the outgoing call operation is performed at any of the extension telephones 25~27, then the CC 3 determines if the outside line which has been in use has unused channels (step 605). If there is no idle channel, the CC 3 sends a command via the extension I/Fs 7~9 for lighting, in the color red, the two-color LED corresponding to the outside line in use on the extension telephone to which the operation has been performed. The CC 3 also sends a command to other extension telephones for lighting two-color LEDs in the color red which correspond to the outside line in use (step 606).

On the other hand, if it is determined at step 605 that the outside line has unused channels, the CC 3 sends a command via the extension I/Fs 7~9 for lighting, in the color green, the two-color LED corresponding to the outside line in use on the extension telephone to which the operation has been performed. Other extension telephones receive a command from the CC 3 for flashing the two-color LEDs corresponding to the outside line in use in the color red with the duty ratio which conforms to the number of unused channels (step 607).

It should be noted that the CPU 101 of the extension telephones 25~27 lights, flashes on extinguishes the two-color LEDs 108~110 in accordance with a command from the CC 3. The hold operation is performed by the function keys 204 and the response to the incoming call, response to the held call and the outgoing call operation are performed by outside-line keys 206~208.

It is permissible to adapt an arrangement in which the CC 3 sends a command to flash the two-color LEDs with the brightness conforming to the number of unused channels at step 607.

It is also permissible to adapt an arrangement in which three-color LEDs are used instead of the two-color LEDs 108~110, and the incoming call and the hold operation are distinctively indicated by different colors.

Furthermore, it is possible for the exchange to accommodate PBX lines as outside lines which have interfaces similar to the ISDN.

As many apparently widely different embodiments of the present invention can be made without departing from the spirit and scope thereof, it is to be understood that the invention is not limited to the specific embodiments thereof except as defined in the appended claims.

What is claimed is:

1. A telephone exchange which accommodates a line having a plurality of channels as well as a plurality of terminals, comprising:

monitoring means for monitoring states of the channels of the line;

informing means for individually informing each of the terminals of the states of the channels; and display means for displaying the state of the channels informed by said informing means so as to distinguish between idle channels and channels in use by the number of display elements less than the number of the channels, wherein said display means displays the states of the channels in a first mode or in a second mode depending upon whether the number of idle channels and channels in use is within a predetermined range.

2. The telephone exchange according to claim 1, wherein the first and second modes are different in displayed color.

3. The telephone exchange according to claim 1, wherein said display means displays in such a manner that in the first mode a display conforming to total number of channels and number of channels in use is presented on a terminal not using any of the plurality of channels if some of these channels are being used by other terminals.

4. The telephone exchange according to claim 1, wherein said display means displays in the first mode in such a manner that a duty ratio at which a display flashes is made to correspond to the total number of channels and the number of channels in use.

5. The telephone exchange according to claim 1, wherein said display means displays in the first mode in such a manner that a display of the number of channels in use versus the total number of channels is presented in correspondence with a duty ratio at which the display flashes.

6. The telephone exchange according to claim 1, wherein said display means displays in the first mode in such a manner that a display of the number of idle channels versus the total number of channels is presented in correspondence with a duty ratio at which the display flashes.

7. The telephone exchange according to claim 1, wherein said display means displays in the first mode in such a manner that a duty ratio at which the display flashes is varied in stages in conformity with the number of channels in use and numbers of channels assigned to prescribed stages in advance.

8. The telephone exchange according to claim 1, wherein said display means displays in the first mode in such a manner that the brightness of a display is made to correspond to the total number of channels and the number of channels in use.

9. The telephone exchange according to claim 1, wherein said display means displays in the first mode in such a manner that a display of the number of channels in use versus the total number of channels is presented in correspondence with the brightness of the display.

10. The telephone exchange according to claim 1, wherein said display means displays in the first mode in such a manner that a display of the number of idle channels versus the total number of channels is presented in correspondence with the brightness of the display.

11. The telephone exchange according to claim 1, wherein said display means displays in the first mode in such a manner that the brightness of the display is varied in stages in conformity with the number of channels in use and numbers of channels assigned to prescribed stages in advance.

12. The telephone exchange according to claim 1, wherein if the number of idle channels is more than or equal to one and the number of channels in use is more than or equal to one, the number of idle channels and the channels in use is within the predetermined range.

13. The telephone exchange according to claim 1, wherein the states of the channels are displayed to flash by said display means in said first mode and the states of the channels displayed by said display means are steady lit in said second mode.

14. The telephone exchange according to claim 1, wherein said display means displays the states of the channels in a third mode at a terminal which is using the channels, regardless of the number of the idle channels and the channels in use.

15. A method of controlling display elements for a communication system which performs a communication via a plurality of channels and has display elements fewer than the plurality of channels in number, comprising the steps of:

judging states of the plurality of channels;

selecting a first mode or a second mode depending upon whether the number of idle channels and channels in use is within a predetermined range; and controlling the display elements in accordance with the mode selected at said selecting step.

16. The method according to claim 15, wherein if the number of the idle channels is more than or equal to one and the number of channels in use is more than or equal to one, the number of idle channels and channels in use is within the predetermined range.

17. The method according to claim 15, wherein the states of the plurality of channels are displayed to flash in the first mode and the states of the plurality of channels are steady lit in the second mode.

18. The method according to claim 15, wherein the first and the second mode are different in displayed color.

19. The method according to claim 15, wherein a display in accordance with the number of channels in use is performed in the first mode.

20. The method according to claim 15, wherein the display elements are controlled in accordance with the number of channels in use in the first mode.

21. The method according to claim 15, wherein the display elements are controlled to flash in accordance with the number of channels in use in the first mode.

22. The method according to claim 15, wherein, in a communication which is using the plurality of channels, a third mode is selected at said selecting step regardless of the number of idle channels and the channels in use.

* * * * *

UNITED STATES PATENT AND TRADEMARK OFFICE
CERTIFICATE OF CORRECTION

PATENT NO. : 5,381,468

DATED : January 10, 1995

INVENTOR : ISAMU OZAWA

It is certified that errors appear in the above-identified patent and that said Letters Patent is hereby corrected as shown below:

ON THE TITLE PAGE

At [54]

"LESS" should read --FEWER--.

At [56] References Cited

Under FOREIGN PATENT DOCUMENTS

"1231495  9/1989  Japan." should read
--1-231495 9/1989  JAPAN--.

COLUMN 1

Line 2, "LESS" should read --FEWER--.

COLUMN 2

Line 49, "(I/F)" should read --(I/Fs)--.

COLUMN 3

Line 12, "103" should read --handset 103--.

COLUMN 5

Line 66, "CFU 101" should read --CPU 101--.

UNITED STATES PATENT AND TRADEMARK OFFICE
CERTIFICATE OF CORRECTION

PATENT NO. : 5,381,468

DATED : January 10, 1995

INVENTOR : ISAMU OZAWA

It is certified that errors appear in the above-identified patent and that said Letters Patent is hereby corrected as shown below:

COLUMN 7

Line 15, "on extinghishes" should read --and extinguishes--.

COLUMN 9

Line 12, "mode" should read --modes--.

COLUMN 10

Line 11, "communication" should read --communication system--.

Signed and Sealed this

Twenty-third Day of January, 1996

Attest:

BRUCE LEHMAN

Attesting Officer

Commissioner of Patents and Trademarks